(12) United States Patent
Daniely et al.

(10) Patent No.: US 8,752,327 B2
(45) Date of Patent: Jun. 17, 2014

(54) OXYGEN AVAILABILITY-BASED IRRIGATION SYSTEM

(76) Inventors: Nissim Daniely, Yokneam (IL); Yeshaiahu Redler, Pardesia (IL); Eitan Israeli, Shilat (IL)

( * ) Notice: Subject to any disclaimer, the term of this patent is extended or adjusted under 35 U.S.C. 154(b) by 24 days.

(21) Appl. No.: 13/697,742

(22) PCT Filed: May 11, 2010

(86) PCT No.: PCT/IL2010/000374
§ 371 (c)(1),
(2), (4) Date: Nov. 13, 2012

(87) PCT Pub. No.: WO2011/141901
PCT Pub. Date: Nov. 17, 2011

(65) Prior Publication Data
US 2013/0055634 A1   Mar. 7, 2013

(51) Int. Cl.
*A01G 29/00* (2006.01)
*A01G 31/00* (2006.01)
(52) U.S. Cl.
CPC .............. *A01G 29/00* (2013.01); *A01G 31/00* (2013.01)
USPC .......................................................... 47/48.5

(58) Field of Classification Search
CPC ............................... A01G 29/00; A01G 31/00
USPC ................................. 47/48.5; 436/25, 55, 136
See application file for complete search history.

(56) References Cited

U.S. PATENT DOCUMENTS

| | | | |
|---|---|---|---|
| 3,681,028 A * | 8/1972 | Mason | 422/50 |
| 4,904,603 A * | 2/1990 | Jones et al. | 436/25 |
| 7,069,692 B2 | 7/2006 | Kuiper | |
| 8,454,729 B2 * | 6/2013 | Mittelmark et al. | 95/90 |
| 2003/0079912 A1 * | 5/2003 | Leuchtenberg | 175/38 |
| 2005/0090936 A1 | 4/2005 | Hitt | |
| 2007/0220808 A1 | 9/2007 | Kaprielian | |

FOREIGN PATENT DOCUMENTS

| | | |
|---|---|---|
| WO | 2005/026053 | 3/2005 |
| WO | 2005/067696 | 7/2005 |

* cited by examiner

*Primary Examiner* — Monica Williams
(74) *Attorney, Agent, or Firm* — Browdy and Neimark, PLLC

(57) ABSTRACT

Irrigation systems (36) and methods are provided that are based on measurements of oxygen levels and availability to the root of the plant. The irrigation management system comprises at least one sensor (24) deducing data indicating the level of oxygen wherein the data collected from the sensors is used to determine irrigation amounts and timing.

16 Claims, 1 Drawing Sheet

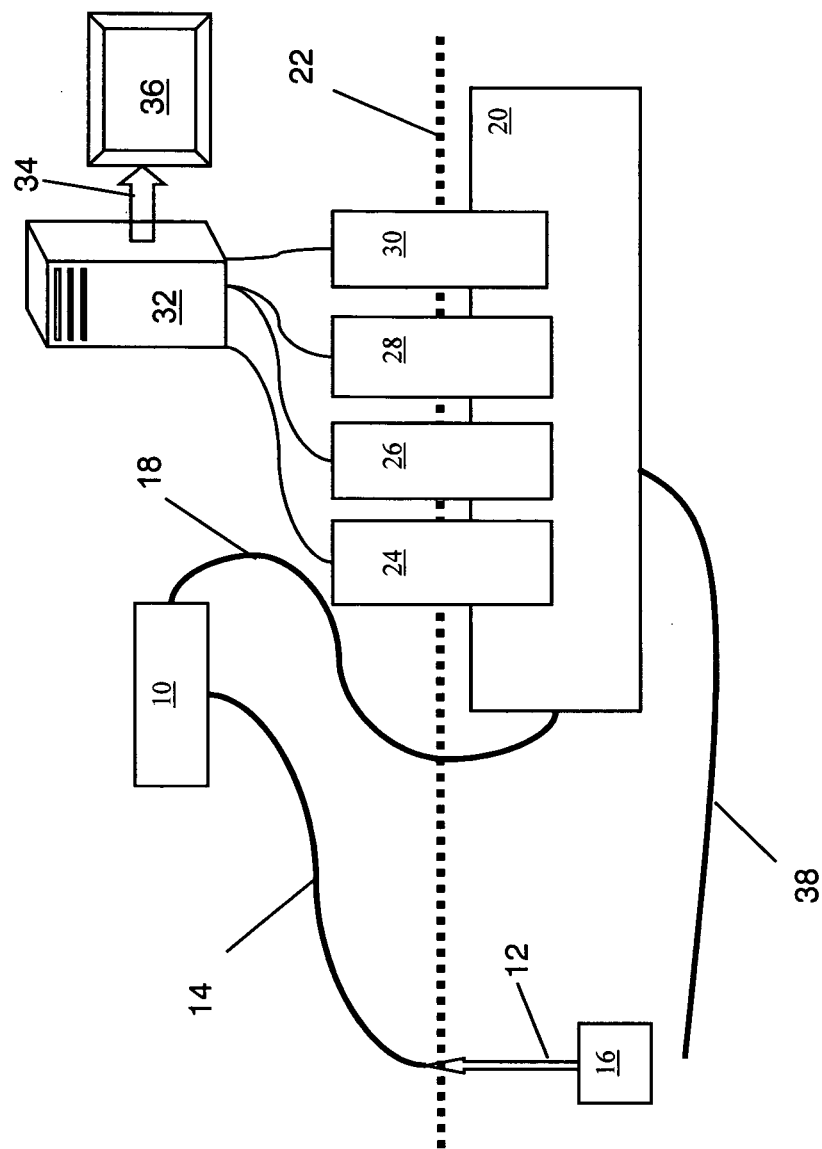

OXYGEN AVAILABILITY-BASED IRRIGATION SYSTEM

FIELD OF THE INVENTION

The present invention relates to irrigation systems. More particularly, the present invention relates to irrigation systems and methods that are based on measurements of oxygen levels and availability to the root of the plant.

BACKGROUND OF THE INVENTION

Irrigation is applying water to assure sufficient soil moisture for good plant growth. Under irrigation, soil and water compatibility is very important. The management of irrigation as performed nowadays is based on the understanding of soil/water/plant interactions so as to guarantee efficient management of the crops, soils, water supplies and irrigation systems.

Some of the parameters that are usually taken into account when managing irrigation systems are the soil texture, which is determined by the size and type of solid particles, the soil structure, which is the grouping of particles, the soil depth, which refers to the thickness of the soil materials which provide structural support, nutrients, and water for plants, as well as soil permeability that is a measure of the ability of air and water to move through the soil. Another set of parameters is the quality of water that is measured by total dissolved solids (TDS) and the sodium absorption ratio (SAR). TDS is the measure of salinity of the water and the SAR is the proportion of sodium relative to calcium and magnesium.

Another parameter that is taken into account is the topography of the filed that is being irrigated, wherein slopes are an obvious parameter that is being accounted for.

As mentioned herein before, the general practice for managing irrigation systems is to understand the interaction between the soil and the water and design accordingly the irrigation system.

Oxygen, which is one of the fundamental essences for plants growth, and its availability, however, is not taken into account when managing irrigation systems. Oxygen deficiency can occur even if the amount of water seems to be sufficient in the soil in the vicinity of the plant's root. Irrigation management without taking into account the availability of oxygen to the root of the plant is not efficient.

SUMMARY OF THE INVENTION

It is an object of the present invention to provide irrigation management system and method that takes into account the measurement of oxygen levels and availability to the root of the plants being irrigated.

It is another object of the present invention to provide an irrigation management system that is based on continuous measurement of oxygen availability in the water solution in the vicinity of the roots.

It is thus provided in accordance with the present invention, an irrigation management system comprising at least one sensor deducing data indicating level of oxygen wherein the data collected from said at least one sensor is used to determine irrigation amounts and timing.

said at least one sensor is capable of deducing additional data indicating availability of oxygen to plants.

Furthermore, in accordance with another preferred embodiment of the present invention, the management system is continuous.

Furthermore, in accordance with another preferred embodiment of the present invention, said at least one sensor comprises an oxygen level sensor, an electrical conductivity sensor, temperature sensor and pH sensor.

Furthermore, in accordance with another preferred embodiment of the present invention, said data and said additional data are formulated from online measurements performed by said at least one sensor.

Furthermore, in accordance with another preferred embodiment of the present invention, said data and said additional data is transferred to a computing means is capable of storing measurements made by said at least one sensor.

Furthermore, in accordance with another preferred embodiment of the present invention, said at least one sensor transmits measurements to said computing means in a wired or wireless manner.

Furthermore, in accordance with another preferred embodiment of the present invention, said computing means is provided with a processor capable of formulating said data and said additional data.

Furthermore, in accordance with another preferred embodiment of the present invention, the system further comprises a pump capable of pumping water solution from the ground through a conduit.

Furthermore, in accordance with another preferred embodiment of the present invention, said conduit is provided with a filter.

Furthermore, in accordance with another preferred embodiment of the present invention, said pump delivers said water solution to an underground chamber that comprises said at least one sensor.

It is furthermore provided in accordance with yet another preferred embodiment of the present invention, an irrigation control method based on measurements of water solution from the vicinity of the plant's roots, said method comprising:
sucking the water solution;
transferring the water solution to a chamber;
providing at least one sensor within said chamber;
online measuring using said at least one sensor;
deducing data indicative of oxygen level in the water solution;
controlling irrigation system based on said data indicative of oxygen level.

Furthermore, in accordance with another preferred embodiment of the present invention, deducing data further comprising data indicative of oxygen availability to the plant root.

Furthermore, in accordance with another preferred embodiment of the present invention, said at least one sensor comprises an oxygen level sensor, an electrical conductivity sensor, temperature sensor and pH sensor.

Furthermore, in accordance with another preferred embodiment of the present invention, the system further comprising burring said chamber underground in the vicinity of the plant roots.

Furthermore, in accordance with another preferred embodiment of the present invention, the water solution is returned to the vicinity of the plant's roots after measurement is performed.

Furthermore, in accordance with another preferred embodiment of the present invention, said data is processed within a processor that receives the measurements from said at least one sensor.

Furthermore, in accordance with another preferred embodiment of the present invention, said data is delivered to said processor in a wired manner or a wireless manner.

BRIEF DESCRIPTION OF THE FIGURES

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appending Description and Claims.

FIG. 1 illustrates an irrigation management system in accordance with a preferred embodiment of the present invention.

DETAILED DESCRIPTION OF THE INVENTION AND FIGURES

The present invention provides a unique and novel irrigation management system that takes into account the availability of oxygen to the root of the plants that are being irrigated. Increased yield of plants is an outcome of appropriate water management. Most modern irrigation systems take into account parameters such as soil characteristics, topography, or water quality. One of the main essences of water, which is the dissolved oxygen concentration, is not taken into account when designing the irrigation systems. Plants are most susceptible to damage from oxygen deficiency and the present invention provides a system for monitoring the dissolved oxygen concentration in the water solution in the vicinity of the roots of the plants in order to provide data that is essential to the growth of the plants.

According to one aspect of the present invention, a pump pumps solution from the soil. The solution is inserted to within a sampling chamber that is preferably buried in the ground. The sampling chamber is preferably provided with oxygen sensor, temperature sensor, electrical conductivity sensor, and pH measurement means. The data from the sensors are transmitted to a computer or any other means in which the information can be processed. The data is then processed and accordingly, the irrigation is determined. The irrigation amounts and times are determined according to predetermined parameters that were inserted to the processing means.

Reference is now made to FIG. 1 illustrating an irrigation management system in accordance with a preferred embodiment of the present invention. The irrigation management system comprises a pump 10 that is preferably a vacuum pump capable of forming vacuum within tubing 14 and sucking conduit 12 that are connected in line to the pump. Sucking conduit 12 is placed underground so as to suck solution from underground and deliver it through tubing 14 to pump 10. The open end of sucking conduit 12 is provided with a filter 16 capable of filtering solids such as sand and other particles that are in the ground so as to allow only solution from the ground to enter conduit 12 and reach pump 10.

The solution from pump 10 is transferred through tubing 18 to sampling chamber 20. Sampling chamber 20 is preferably buried beneath ground level, which is indicated by doted line 22. The sampling chamber is buried underneath ground level so as to preserve the conditions that the solution experienced when it was in the vicinity of the plants, and especially to preserve the temperature of the solution.

Sampling chamber 20 is provided with several sensors that are collecting information from the pumped water solution. An oxygen sensor 24 is provided within sampling chamber 20 wherein oxygen sensor 24 can be any available sensor without limiting the scope of the present invention but preferably an oxygen sensor that is provided with a selective membrane or a photoelectric cell. An electrical conductivity sensor 26 is provided as well collecting information on the salinity of the water solution in the ground, which is also an important parameter indicating the availability of oxygen. As the electrical conductivity level is higher, the availability of the oxygen to the plant is lowered.

Temperature sensor 28 and Ph 30 measurement is also performed in the solution within sampling chamber 20. It should be noted that it is possible to choose another combination of sensors that may indicate the availability of oxygen in the water solution in the vicinity of the plant's roots. Any combination of sensors is possible without limiting the scope of the present invention.

The data from the different sensors is delivered in a wired manner or a wireless manner preferably to a computing means 32 that received the data and can store the data or data that is processed by a processor. It should be noted that computing means 32 can be means that solely stores data and can transfer it to a processing means that is positioned remotely from the site or in a vicinity of the site or a means that also process the data. In any case, an output 34 is provided to computing means 32 that is capable of outputting data, processed or unprocessed, to other computing means or display. The data that is serves as output 34 is used in order to control a connected irrigation system 36 for watering the plants.

The availability of oxygen that is derived from the parameters that are being measured by the different sensors and deduced from the data collected in computing means 32 is processed so as to determine the amount of watering provided by irrigation system 36 and its timing.

There are many incidents in which the oxygen availability is of higher significance than the amount of water in the vicinity of the roots. As an example, when watering is performed in order to warm up the ground temperatures in areas of freezing temperatures, a relatively low oxygen level that might be sensed in the vicinity of the roots can indicate the irrigation system to stop irrigation. The oxygen level in this case is more important than the temperature measurement since the deficiency of oxygen has more damaging affect than the low temperature.

It should be noted that the combination of sensors in the sampling chamber of the present invention is to be determined according to the data that is derived from the sensors measurements in order to determine the level of oxygen in the vicinity of the roots and its availability. The irrigation system of the present invention is controlled by parameters that are deduced from the sensors measurements and provides indication on the oxygen level and availability.

Water solution that is being monitored within sampling chamber 20 is discharged from the chamber and preferably returned to the area from which it was sucked by tubing 38 so as to prevent any intervention to the natural processed occurs in the area. However, discharge of the water solution can be performed in any other manner.

It is important to notice that the irrigation management system of the present invention is managed in a continuous manner and the information on the oxygen level and availability on the vicinity of the root is measured in a continuous manner so as to obtain online control of the irrigation process.

It should be noted that the data that is being collected by the sensors and the measurements are being transferred in the system using wired manes or wireless means, as well known by persons skilled in the computerizing art.

It should be clear that the description of the embodiments and attached Figures set forth in this specification serves only for a better understanding of the invention, without limiting its scope as covered by the following claims.

It should also be clear that a person skilled in the art, after reading the present specification can make adjustments or amendments to the attached Figures and above described embodiments that would still be covered by the following claims.

The invention claimed is:

1. An irrigation management system comprising:
   at least one sensor transmitting data that can be deduced to indicate level of oxygen availability in water solution from the vicinity of plants' roots, and
   a pump configured to pump water solution from the ground in the vicinity of said plant's roots through a conduit, wherein said pump delivers the water solution to a chamber that comprises said at least one sensor;
   a processing means, wherein said data and said level of oxygen availability is used by the processing means to determine irrigation amounts and timing to the plants; and
   wherein said chamber is positioned underground.

2. The management system as claimed in claim 1, wherein the management system is continuous.

3. The management system as claimed in claim 1, wherein said at least one sensor comprises an oxygen level sensor, an electrical conductivity sensor, temperature sensor and pH sensor.

4. The management system as claimed in claim 3, wherein said data and said additional data are formulated from online measurements performed by said at least one sensor.

5. The management system as claimed in claim 1, wherein said data and said additional data is transferred to a computing means capable of storing measurements made by said at least one sensor.

6. The management system as claimed in claim 5, wherein said at least one sensor transmits measurements to said computing means in a wired or wireless manner.

7. The management system as claimed in claim 5, wherein said computing means is provided with a processor capable of formulating said data and said additional data.

8. The management system as claimed in claim 1, wherein said conduit is provided with a filter.

9. An irrigation control method based on measurements of water solution from the vicinity of the plant's roots, said method comprising:
   sucking the water solution;
   transferring the water solution to a chamber;
   providing at least one sensor within said chamber;
   online measuring using said at least one sensor;
   deducing data indicative of oxygen level in the water solution;
   controlling irrigation system based on said data indicative of oxygen level; and
   wherein the water solution is returned to the vicinity of the plant's roots after measurement is performed.

10. The method as claimed in claim 9, wherein deducing data further comprising data indicative of oxygen availability to the plant root.

11. The method as claimed in claim 9, wherein said at least one sensor comprises an oxygen level sensor, an electrical conductivity sensor, temperature sensor and pH sensor.

12. The method as claimed in claim 9, further comprising burring said chamber underground in the vicinity of the plant roots.

13. The method as claimed in claim 9, wherein said data is processed within a processor that receives the measurements from said at least one sensor.

14. The method as claimed in claim 13, wherein said data is delivered to said processor in a wired manner or a wireless manner.

15. An irrigation management system comprising:
   at least one sensor measuring and transmitting data that can be deduced to indicate level of oxygen availability in water solution from the vicinity of plants' roots, and
   a pump configured to pump water solution from the ground in the vicinity of said plant's roots through a conduit, wherein said pump delivers the water solution to a chamber that comprises said at least one sensor;
   a processing means, wherein said data and said level of oxygen availability is used by the processing means to determine irrigation amounts and timing to the plants; and
   wherein the water solution is returned to the vicinity of the plant's roots after measurement is performed.

16. An irrigation control method based on measurements of water solution from the vicinity of the plant's roots, said method comprising:
   sucking the water solution;
   transferring the water solution to a chamber;
   providing at least one sensor within said chamber;
   online measuring using said at least one sensor;
   deducing data indicative of oxygen level in the water solution;
   controlling irrigation system based on said data indicative of oxygen level; and
   wherein said chamber is positioned underground.

* * * * *